G. M. KELSEY.
SPRING SUSPENSION FOR VEHICLES.
APPLICATION FILED DEC. 22, 1920.
1,391,192.
Patented Sept. 20, 1921.
2 SHEETS—SHEET 1.
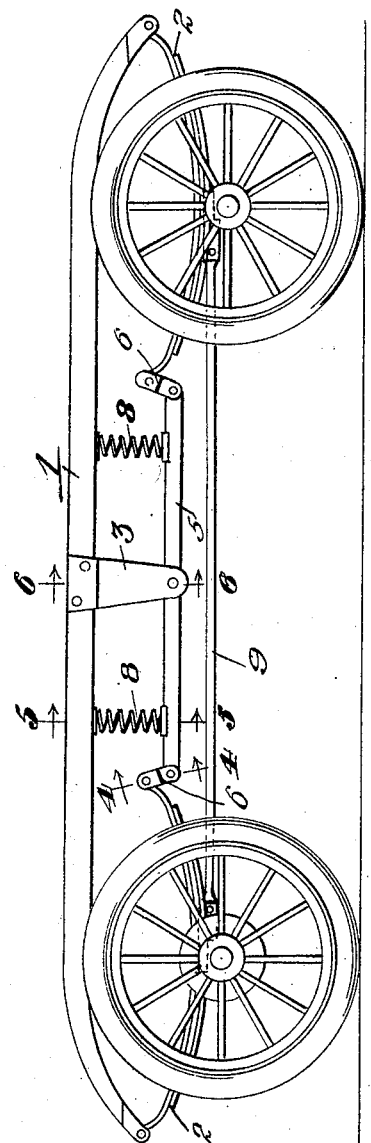
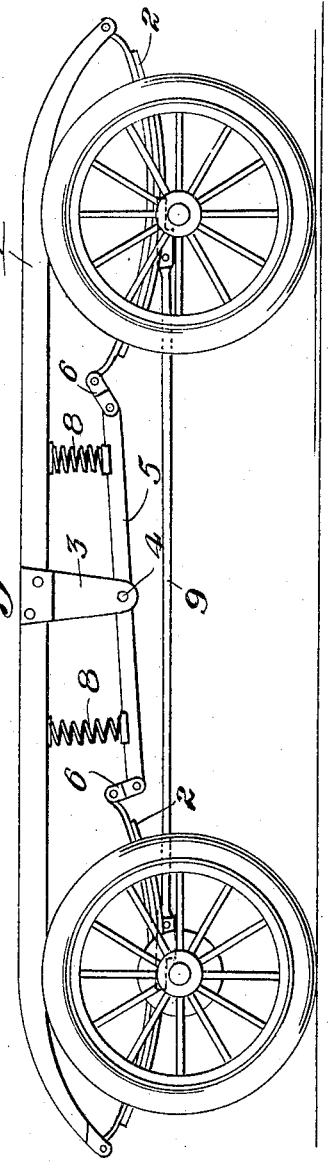
Inventor
George M. Kelsey,
By William C. Linton.
Attorney.

G. M. KELSEY.
SPRING SUSPENSION FOR VEHICLES.
APPLICATION FILED DEC. 22, 1920.
1,391,192.
Patented Sept. 20, 1921.
2 SHEETS—SHEET 2.
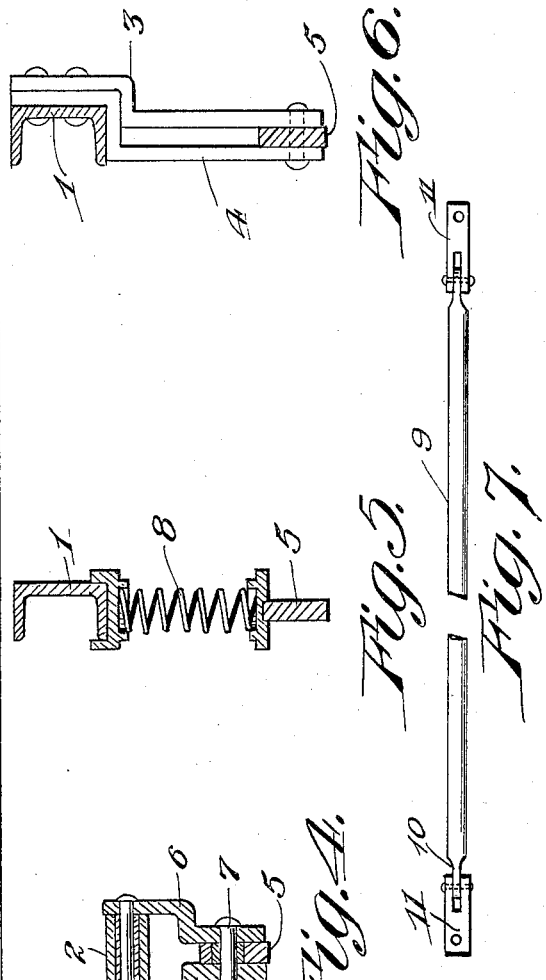
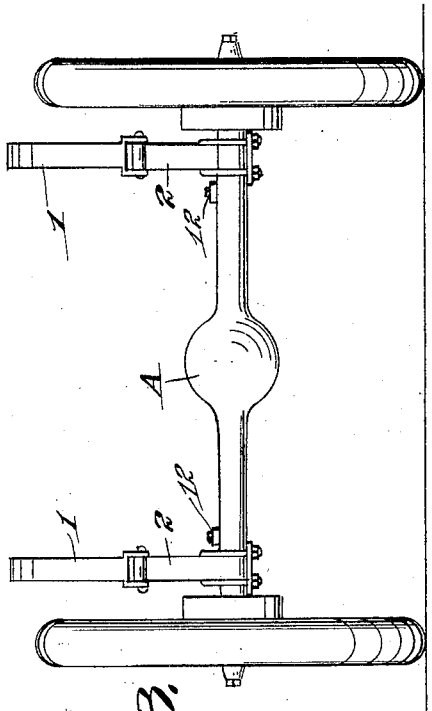
Inventor
George M. Kelsey,
By William C. Linton
Attorney

UNITED STATES PATENT OFFICE.

GEORGE MORTIMER KELSEY, OF GRAND FORKS, NORTH DAKOTA.

SPRING SUSPENSION FOR VEHICLES.

1,391,192.   Specification of Letters Patent.   Patented Sept. 20, 1921.

Application filed December 22, 1920. Serial No. 432,485.

*To all whom it may concern:*

Be it known that I, GEORGE M. KELSEY, a subject of the King of Great Britain, and a resident of Grand Forks, county of Grand Forks, and State of North Dakota, have invented certain new and useful Improvements in Spring Suspensions for Vehicles, and do hereby declare that the following is a full, clear, and exact description of the invention, such as will enable others skilled in the art to which it appertains to make and use the same.

This invention relates to improvements in spring suspension for vehicles, having for an object to provide an improved form of spring equalizer and shock absorber for the chassis of motor driven vehicles, whereby shocks or other stress directed onto a vehicle so equipped will be evenly distributed throughout the usual supporting springs thereof for uniform absorption, and also, will permit the body of such vehicle to remain in a substantially level position during the travel of such vehicle over an uneven surface.

Another and equally important object of the invention resides in the novel mounting of the rear or driving axle of the vehicle equipped with my improved spring equalizer and shock absorber, the connection of the invention to the rear springs being such as to absorb any abnormal stress imparted to said rear springs by reason of the torque action of the axle when driven from the vehicle motor, this stress being normally absorbed by the rear springs and being transmitted by shackle connection to the equalizing members from whence it is transmitted for distribution in the forward springs of the vehicle; thus, preventing those detrimental results caused by driving through a rigid shaft.

Other objects of this invention will be in part obvious and in part pointed out hereinafter.

In order that the invention and its mode of operation may be readily understood by persons skilled in the art, I have in the accompanying illustrative drawings and in the detailed following description based thereon, set out a preferred embodiment of the same:

In these drawings:

Figure 1 is a side elevation of a vehicle provided with my improved type of spring equalizer;

Fig. 2 is a similar view of the same, showing the relative position of the forward and rear semi-elliptical supporting springs of a vehicle provided with my invention when subjected to material stress;

Fig. 3 is a rear end elevation of Fig. 1;

Fig. 4 is a detail section taken on the line 4—4 of Fig. 1;

Fig. 5 is a detail section taken on the line 5—5 of Fig. 1; and

Fig. 6 is a detail section taken on the line 6—6 of Fig. 1 in the direction of the arrows as shown, and Fig. 7 is a detail in elevation showing the type of truss rod employed.

Referring now more particularly to the drawings, in connection with which like characters of reference will designate corresponding parts throughout the several views, 1 indicates the vehicle chassis in its entirety having forward and rear semi-elliptical supporting springs 2 connected in the usual manner to the front and rear horns of the chassis 1; the adjacent ends of the springs, however, being free from direct connection with such chassis. Secured to and disposed transversely of the rear springs 2 is the drive axle A of the vehicle, which when rotated from the engine, will have detrimental or abnormal torque action thereupon absorbed and evenly distributed throughout the vehicle chassis spring construction in a manner to be presently described.

It may be here noted, that the springs 2 on each side of the vehicle are similarly connected with my invention, and therefore, for the purpose of convenience, description will be hereinafter had to the springs on but one side of the vehicle.

Secured to the intermediate portion of the side of the vehicle chassis is a substantially vertical bracket arm 3 having a bifurcated bearing portion formed on its lower end as at 4, pivotally receiving and supporting the equalizing bar 5, which bar, as will be noted, is arranged parallel, in a vertical plane, with relation to the chassis side. Shackles 6 are pivotally connected at 7 to the opposite ends of the equalizing bar, and in turn are similarly connected to the adjacent ends of the semi-elliptical supporting springs 2, thus interconnecting the forward and rear springs and permitting stress or shock from one to be imparted, by way of the equalizing bar, to the other spring, for uniform absorption.

As means for maintaining springs 2 in their normal positions together with the equalizer bar, coil springs 8 are positioned between the opposite end portions of said bar and the corresponding portions of the chassis side, these springs, of course, being secured to their respective parts, in any suitable manner.

From the foregoing, it is to be understood that with my improved invention, I am enabled to obtain a spring drive through the driving action of a vehicle so equipped, and in obtaining this drive it is obvious that the transmission of abnormal stress to the vehicle chassis, or the subjection of the driving shaft to such stress, will be prevented, since with ample torque action of the driving shaft on rotation upwardly, the rear semi-elliptical springs 2 will be flexed slightly downwardly, and at the same time will pull downwardly upon their respective shackle connections 6, thus pulling the adjacent ends of the equalizing bars 5 in a corresponding direction, while the opposite ends thereof are moved upwardly. The stress so applied from the driving axle from the rear semi-elliptical springs, by reason of this absorbing action, will be normally transmitted from said rear springs 2 by way of the equalizing bars 5, to the forward semi-elliptical supporting springs 2, and hence will be evenly distributed throughout the spring construction of the chassis. By reason of this distribution of abnormal stress created through the abrupt rotation of the drive axle A, detrimental results to the vehicle motor, transmission, differential, and driving action itself, will be practically eliminated, and the user of such a device will be insured of gradual starting of the vehicle. Furthermore, the arrangement of the equalizing bars is such as to not only equalize the distribution of stress evenly throughout the vehicle springs, but also to function to fully absorb any shock or stress to which the vehicle wheels may be subjected, as illustration—when they are traveling over a rough or uneven roadway. Should the forward wheels of the vehicle be subjected to an abrupt shock, the corresponding springs 2 thereof will be caused to flex upwardly, thus moving the inner ends of the same upwardly, as shown in the Fig. 2. This upward motion will cause corresponding movement of the adjacent ends of the equalizer bars 5 arranged on the opposite sides of the chassis 1, and by consequence, the opposite ends of these equalizer bars will be moved downwardly, flexing the rear springs downwardly. Such action, in addition to permitting full absorption of the stress so incurred by distribution through the forward and rear springs, will also effect elevation of the rear end of the vehicle chassis in order that the same will be maintained in a substantially level position. The action of the equalizing bars in the event that the rear wheels should come into contact with an obstruction in the roadway, would, of course, correspond to that explained in connection with the forward springs 2, except that the relative action of the two sets of springs would be opposite to that just described.

In Fig. 7 I have shown the type of truss rod employed, and in some instances, desirable, for use in connection with a vehicle equipped with my improved spring equalizer and shock absorber, the same consisting of a rod 9 having reduced extremities 10 which are pivotally connected between the adjacent bifurcated ends of connecting links 11, said links having their free extremities provided with a bolt opening or openings whereby the same may be securely engaged with the front and rear axles of the motor driven vehicle, as shown in the Figs. 1, 2 and 3, and indicated at 12. In this connection, it is to be understood that two of these truss rods are employed upon the vehicle, and that the same are disposed longitudinally with the chassis thereof and engaged with the forward and rear axles at points just inside of the mounting of such axles upon their respective semi-elliptical springs 2, this arrangement being clearly shown in the Fig. 3. By the provision of truss rods such as I have described, attention is invited to the fact that the same will serve to materially relieve the springs of excessive flexing due to the imparting of abnormal stress thereto, and yet, will allow the springs to function in a manner to fully absorb that portion of the stress transmitted thereto and to evenly distribute the same throughout the chassis spring suspension. In addition to the foregoing, the truss rods will also serve as means for insuring proper relative positioning of the forward and rear axles in the event of fracture of the springs on which said axles are mounted, in that they will prevent movement of the axles longitudinally of the vehicle or dislocation of the same from their transverse mountings with respect to the chassis. Because of the pivotal connections of the truss rods with the axles, however, relative forward or downward movement between the same to the desired extent, will be permitted.

Manifestly, the construction shown is capable of considerable modification, and such modification as is within the scope of my claims, I consider within the spirit of my invention.

What I claim is:

1. The combination with the semi-elliptical supporting springs of a vehicle chassis, the adjacent ends of which are free, of equalizing bars pivotally supported by the opposite sides of the chassis and extending parallel thereto, having their opposite ends pivotally connected to the adjacent free ends of the semi-elliptical supporting springs, and other spring means arranged between the opposite end portions of the equalizing bars and the corresponding portions of the vehicle chassis sides.

2. The combination with the semi-elliptical supporting springs of a vehicle, the adjacent ends of which are free, of downwardly extending bracket arms secured to the opposite sides of the chassis intermediate the ends thereof and arranged at substantially right angles thereto, equalizing bars pivotally mounted intermediate their ends on said bracket arms, shackles pivoted to the opposite ends of the said bars and to the adjacent free ends of the semi-elliptical supporting springs, and coil springs arranged between and secured to the opposite end portions of the equalizing bars and the corresponding portions of the chassis sides.

In witness whereof I have hereunto set my hand.

GEORGE MORTIMER KELSEY.